Feb. 15, 1966 T. E. LYON 3,234,963
MANIFOLD ASSEMBLY
Filed Nov. 28, 1962 2 Sheets-Sheet 1
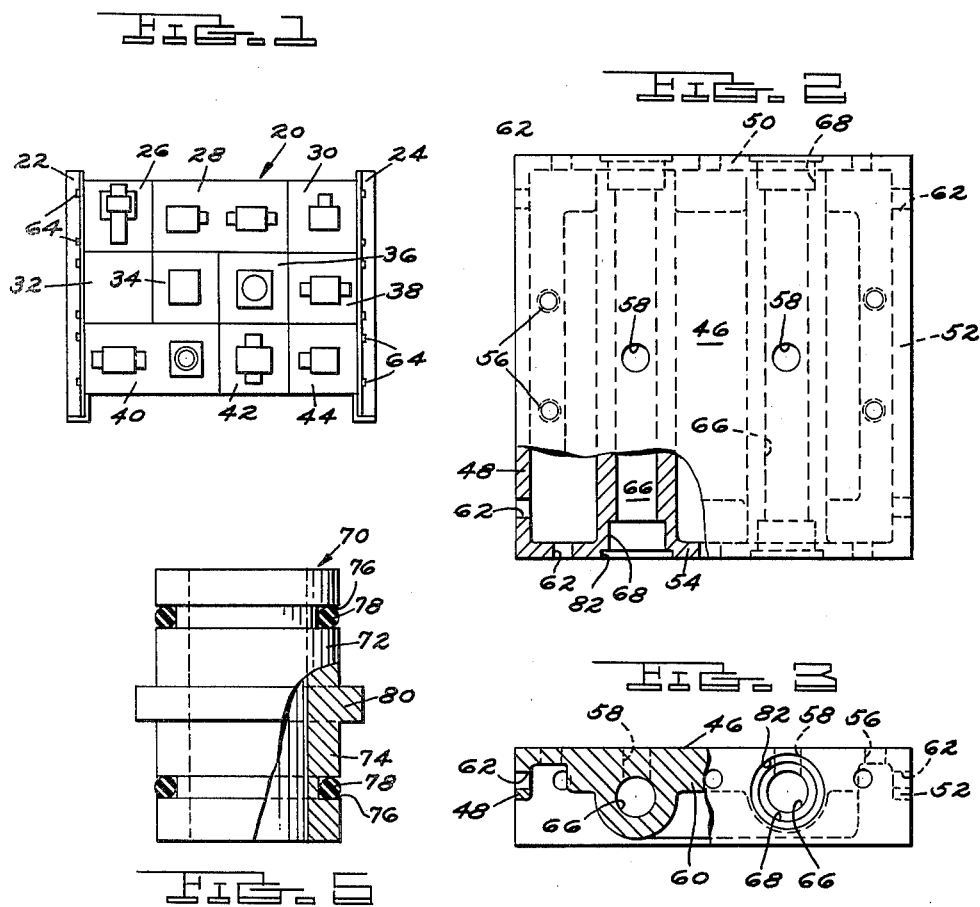
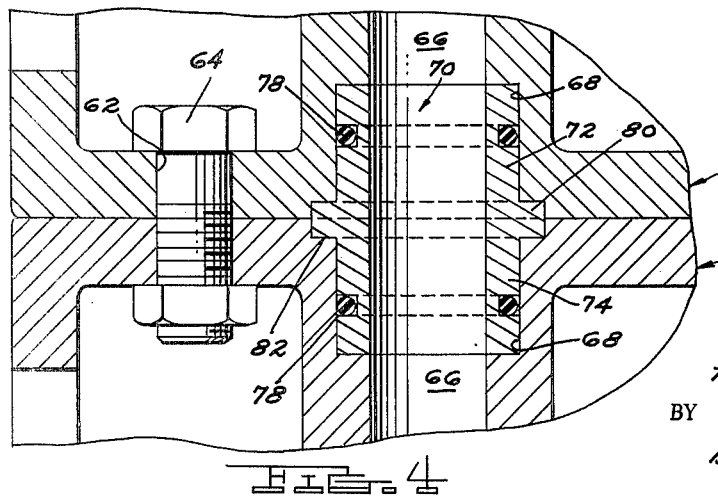
INVENTOR.
THOMAS E. LYON
BY
Burton & Parker
ATTORNEYS

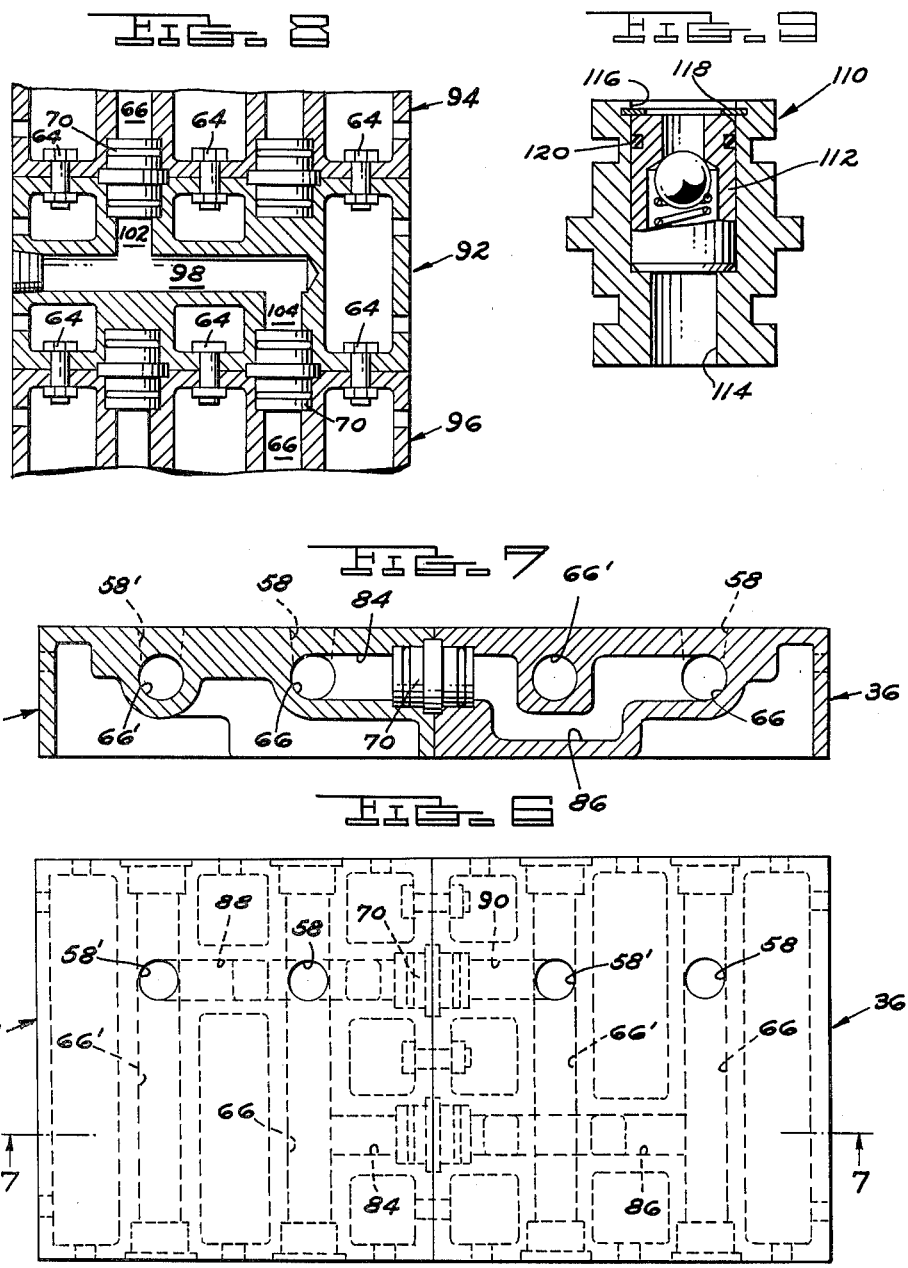

United States Patent Office

3,234,963
Patented Feb. 15, 1966

3,234,963
MANIFOLD ASSEMBLY
Thomas E. Lyon, 2441 Charnwood Drive,
Birmingham, Mich.
Filed Nov. 28, 1962, Ser. No. 240,525
1 Claim. (Cl. 137—608)

This invention relates to a manifold assembly and module sections therefor, for supporting and establishing communiaction between a plurality of fluid pressure valves such as solenoid-controlled fluid pressure valves and related apparatus forming a part of a fluid pressure control system or the like.

An object of the invention is the provision of a manifold assembly comprising standard size module sections which serve as mounting plates for fluid pressure valves and which are provided with passageways therein establishing fluid conducting communication between valves mounted on separate plates of the assembly.

Another object of the invention is the provision of a manifold assembly comprising such module sections provided with fluid conducting passageways therein, which sections may be assembled in any desired pattern and wherein the sections are so constructed as to permit fluid communication among the sections both laterally and longitudinally. That is, the passageways in a section of the manifold assembly may communicate with similar sections above, below and on either side of such section, eliminating the expensive and unwieldy array of fluid pressure lines heretofore required in such systems.

A further object of the invention is the provision of a novel sealing means for providing fluid tight communication between passageways in juxtaposed sections which sealing means also acts as a guide to assure accurate alignment of adjacent sections, and which in addition holds the assembled sections against relative lateral shifting.

Other objects, advantages and meritorious features will more fully appear from the following specification, claim and accompanying drawings, wherein:

FIG. 1 is a front elevation of a manifold assembly embodying the invention;

FIG. 2 is a front elevation showing one of the module sections for the manifold assembly, with a portion of the section broken away to show certain details more clearly;

FIG. 3 is an end elevation, partly in cross section, of the module section shown in FIG. 2;

FIG. 4 is an enlarged partial cross sectional view showing the juncture of two module sections and a sealing nipple establishing fluid tight communication between passageways in the jutaxposed sections;

FIG. 5 is an enlarged plan view, partly in section, of the sealing nipple shown in FIG. 4;

FIG. 6 is a front elevation of a pair of module sections similar to that shown in FIG. 2 showing the bolts securing the sections together and the relationship of the passageways in the sections;

FIG. 7 is a cross sectional view taken along line 7—7 of FIG. 6;

FIG. 8 is a cross sectional view illustrating one arrangement of module sections showing the bolts securing the sections together and the fluid passageways establishing communication between the sections; and FIG. 9 is a cross sectional view of the sealing nipple, showing a check valve positioned therein.

A typical manifold assembly according to my invention is shown at 20 in FIG. 1. Such an assembly may be supported on the machinery that is to be controlled, or on a fluid pressure tank supplying pressure fluid to the system, or in any other convenient location. Preferably the assembly is secured between two angle iron members 22 and 24 as shown in FIG. 1, with bolts extending through the edges of the manifold securing it to the angle irons.

The assembly consists of a plurality of standardized planar module sections indicated at 26, 28, 30, 32, 34, 36, 38, 40, 42 and 44 in FIG. 1. The sections are arranged in edge-abutting coplanar relation and are removably secured together to form a rigid structure. Each of the module sections is dimenisonally related as a whole number multiple of each of the other sections so that the sections may be assembled in any of various combinations to fill out the manifold assembly shown in FIG. 1 or other size and shape assemblies as are desired. For example, the module section 28 is eqaul in size to the two panel sections 34 and 36 placed side by side. It is apparent that other size sections could be provided, as long as all the sections are related as whole number multiples of each other.

In FIGS. 2 and 3 there is shown a typical module section upon which is to be mounted a fluid pressure valve. While shown as square, the section may also be rectangular. Each section is generally plate-like, and is provided with a front face 46 and perpendicular marginal flanges 48, 50, 52 and 54 extending rearwardly of the front face 46. As shown, the front face 46 is ground flat and is provided with threaded holes or valve mounting means 56 to receive bolts for securing a valve to the front face 46 of the section and also fluid inlet and fluid outlet port means or apertures 58 establishing fluid conducting communication between the valve ports and the other portions of the system, as hereinafter more fully described. The portion of the section as is indicated at 60 in FIG. 3 to which the valve is secured must be of sufficient thickness to withstand the shock and operating forces present in such a system.

Each of the flanges 48, 50, 52 and 54 is provided with bolt holes 62 extending perpendicularly therethrough which are equidistantly spaced in the flanges of all the sections so that the sections of various sizes may be bolted together. The bolts securing the sections together extend through the flanges as shown most clearly at 64 in FIG. 7.

The bolt holes 56 and apertures 58 in each module section are arranged in a predetermined pattern to accommodate a specific valve. Thus, for each type and size of fluid pressure valve, there is a particular module section having bolt holes and apertures therein corresponding to the bolt holes and port openings of that specific valve.

Each of the module sections is provided with passageways establishing fluid conducting communication between the various valves and the fluid pressure system to which the valve is connected. The passageways communicate with the apertures 58 which in turn communicate with corresponding ports in the fluid pressure valve. By utilizing the novel sealing nipple and module section construction, passageways may be provided in the various sections which comprise the manifold assembly so that communication may be established in any or all directions. In other words, referring to FIG. 1, passageways may be provided in section 36 for example establishing communication in a vertical direction with sections 28 and 42, and also establishing communication in a horizontal direction with sections 34 and 38, if so desired. Heretofore panels for mounting fluid pressure control valves and having passageways therein have been secured together in single rows or tiers with tie rods extending through the fluid conducting passageways. Such constructions are inherently limited to a single row of individual panels or sections having passageways establishing fluid communication therebetween, and if a second or third row of panels is required, external piping must be provided to establish communication among the various rows of panels. In addition, some sealing means must be provided at the opposite extremities of the tie rods securing the panels together to prevent leakage of fluid from the passageways.

Each of the module sections is provided with passageways which establish fluid communication between adjacent sections, such as the passageways 66 shown in FIGS. 2 and 3. These passageways extend through the various sections and are arranged in a predetermined pattern to accommodate the particular valves which are to be mounted on the sections. Pressure fluid is thus supplied to the valves through passageways 66 and the inlet and outlet ports 58 which communicate with the passageways. In this manner pressure fluid may be delivered to a series of valves mounted on individual sections to form an assembly such as shown at 20 in FIG. 1 without the necessity of providing external piping to establish communication among the various valves.

FIGS. 4 and 5 show the means for establishing fluid tight communication between passageways in juxtaposed sections. The fluid passageways 66 (FIG. 4) open through the meeting edge faces of the juxtaposed sections, which have been arbitrarily numbered 38 and 44. It is apparent that the other sections making up the manifold assembly of FIG. 1 will be similarly connected together. Each of the passageways 66 is provided at its open end with a counterbore 68 (see FIGS. 2 and 4). A tubular nipple 70 is provided having identical opposite end portions 72 and 74 which are slidably receivable within the counterbores 68. The inner diameter of the nipple 70 is sized to correspond with the diameter of the passageways 66 to permit unrestricted fluid flow through the nipple. Adjacent each end of the nipple is an annular external groove 76, within which is positioned sealing means such as the O-ring seals 78.

Preferably each tubular nipple 70 is provided midway of its length with a peripheral rib 80, and each passageway 66 is provided with a secondary counterbore 82 of greater diameter than the counterbore 68 within which the nipple end portions 72 and 74 are received. With the sections assembled as shown in FIG. 4, the peripheral rib 80 is entrapped within the secondary counterbores 82, preventing axial shifting of the nipple.

In assembling a pair of adjacent sections, one end of the nipple 70 is first positioned within one of the sections, and then the adjacent section is mounted on the first section by telescoping its counterbore over the projecting opposite end of the nipple. For example, to assemble the sections shown in FIG. 4, nipple end 74 is slidably inserted into counterbore 68 in section 44, and then section 38 is drawn up against section 44 by telescoping its counterbore 68 over nipple end 72. The flanges of the sections are then rigidly removably secured together by the bolt 64 extending through the bolt holes 62. When thus assembled, the O-ring seals 78 provide fluid tight communication between the sections, with the nipple rib 80 trapped within the counterbores 82, preventing any axial shifting of the nipple 70 within the counterbores 68.

With the provision of the tubular nipples 70 and cooperating O-ring seals 78 in the counterbores 68 it is possible to assure a fluid tight seal between the passageways. With such construction, slight misalignment of the abutting faces of adjacent sections can be tolerated without the danger of fluid pressure leaks at the mating faces of the sections. In addition, where two or more columns or rows of sections are to be secured together such as shown in FIG. 1, it is not necessary that the sections be perfectly square. In assembling a manifold as above described, the nipples 70 act as guides or dowels when two adjacent sections are being put together. When one section is telescoped over the projecting end of the nipple, the sections are aligned and held against relative shifting while the bolts 64 are inserted to rigidly hold them in position.

In FIGS. 6 and 7 is shown one arrangement of fluid passageways between two adjacent sections, for example the sections 34 and 36 of FIG. 1. In FIGS. 6 and 7, the fluid inlet ports are indicated at 58 and the outlet ports at 58′, while the longitudinal passageways communicating with the ports 58 are shown at 66, and those communicating with the ports 58′ are at 66′, for purposes of illustration. Passageways 66 and 66′ extend longitudinally through the sections 34 and 36 to conduct fluid under pressure to the various ports 58 and 58′. In addition, there are provided transverse passageways establishing communication in the opposite direction. For example, as shown most clearly in FIG. 7, if it is desired to establish communication between the two passageways 66 in sections 34 and 36, there is provided a transverse passageway 84 in section 34 and a mating passageway 86 in section 36. Each passageway is provided with a suitable counterbore as above described within which a sealing nipple 70 is positioned. Thus fluid communication is established between pasageways 66, which in turn communicate with the respective fluid inlet ports 58 which are coupled to the ports of the fluid pressure valves. In like manner the passageways 66′ and outlet ports 58′ are coupled together by similar passageways shown at 88 and 90 in FIG. 6.

In FIG. 8 there is shown at 92 a module section which might be aptly termed a fluid supply section interposed between two sections 94 and 96 upon which valves (not shown) would be mounted. Supply section 92 does not have a valve mounted thereon, but merely serves to supply pressure fluid to the system. Blocks 94 and 96 are provided with passageways 66 as above described which passageways are each fluid tightly sealed between juxtaposed sections by the sealing nipples 70. All the sections are secured together at their abutting flanges by the bolts 64 extending through the flanges.

Supply section 92 is provided with a longitudinal passageway 98 having a threaded end portion 100 for attachment to a suitable fluid pressure coupling (not shown) connected to a source of fluid under pressure. Communicating with passageway 98 are two oppositely directed passageways 102 and 104, which in turn communicate through nipples 70 with passageways 66 in sections 94 and 96 respectively to furnish fluid under pressure thereto.

If it becomes necessary to replace one of the sections of the manifold assembly such as is shown in FIG. 1, such may be accomplished easily and conveniently. As an illustration, if the section 34 of FIG. 1 is to be removed and replaced by a similar section, the top horizontal row of sections 26, 28 and 30 is first removed from the assembly by removing the bolts connecting them to the sections 32, 34, 36 and 38, and lifting the entire top row out of the assembly as a unit. The middle row containing section 34 is then removed from the assembly in the same manner. Section 34 is then unbolted from sections 32 and 36, and a new section is bolted therebetween in its place. Both horizontal rows of sections may then be replaced in the assembly as a unit by merely telescoping the counterbores over the projecting nipples in the adjacent row and bolting the rows together, in the same manner as above described for assembling two sections together. The projecting nipples serve as guides or dowels to accurately align the sections whereby the bolts may then be easily inserted to secure the assembly rigidly together. It will be noted that some of the sections, such as section 32 in FIG. 1, may be left blank. When an additional valve is to be added to the system, panel 32 is removed and the proper section for mounting the particular valve is inserted in its place. Such blank sections may also serve as convenient supports upon which may be mounted pressure gauges, electric switches, or the like. Opposite sides of the manifold assembly are secured to the upright angle irons 22 and 24 by bolts 64 identical to those for securing the sections together. The bolt holes in the uprights are spaced to be aligned with the holes 62 in the section flanges so that no special holes need be provided for securing the assembly to the uprights.

Shown in FIG. 9 is another embodiment of the sealing nipple shown in FIG. 5. Frequently it is desirable to permit fluid communication in only one direction through the passageways in the module sections. The nipple 110 has been provided, as shown, with a check valve 112 positioned therein. Nipple 110 is similar to nipple 70, and is provided with a fluid passageway 114 opening through one end thereof, and an enlarged counterbore 116 opening through the opposite end. The counterbore 116 exhibits a suitable groove within which there is removably positioned a snap ring 118. Check valve 112 has chamfered ends to permit it to be easily slidably received within counterbore 116 either in the position shown or in an axially reversed position. Snap ring 118 holds the check valve within the nipple as shown. Check valve 112 is of conventional construction and need not be further described except to note the provision of a sealing ring such as the O-ring 120 encircling the valve to prevent fluid from by-passing the valve.

I claim:

A manifold assembly comprising: a plurality of rectangular module sections dimensionally related as whole-number multiples of each other, each of said module sections including a plate-like base having a planar front face portion having a fluid inlet port and a fluid outlet port opening therethrough and valve mounting means for securing a valve in face-abutting relation against said planar face; an integral flange projecting rearwardly from each marginal edge of said base plate and terminating beyond the rear face of said plate, said integral flanges provided with bolt-receiving apertures opening laterally therethrough at standardized intervals therealong; bolt means extending through at least some of said flange apertures for rigidly securing adjacent module sections together in flange-abutting relation to form a rigid unitary structure; fluid-conducting conduit means in said module section base for establishing communication among selected fluid inlet and outlet ports, said conduits being disposed with their axes substantially parallel to said planar face of the base, and at least some of such conduits having end portions opening through said module flanges for establishing communication between adjacent module sections; and sealing means positioned in said conduit end portions for preventing leakage of fluid therefrom at the mating surfaces of adjacent module sections, said sealing means including a nipple member having opposite end portions slidably removably engaged within aligned confronting conduit ends with an elastomeric sealing ring interposed between each nipple end portion and its associated conduit end portion.

References Cited by the Examiner

UNITED STATES PATENTS 2,834,368   5/1958   Gray _____ 251—367
3,068,896   12/1962  Grove _____ 137—269 X

FOREIGN PATENTS 1,031,595   6/1958   Germany.

ISADOR WEIL, *Primary Examiner.*

WILLIAM F. O'DEA, *Examiner.*